UNITED STATES PATENT OFFICE.

ADOLF KITTEL, OF VIENNA, AUSTRIA-HUNGARY.

PROCESS FOR RECLAIMING VULCANIZED-RUBBER WASTE.

No. 825,060.        Specification of Letters Patent.        Patented July 3, 1906.

Application filed September 23, 1903. Serial No. 174,252.

*To all whom it may concern:*

Be it known that I, ADOLF KITTEL, a subject of the Emperor of Austria-Hungary, and a resident of Vienna, Austria-Hungary, have invented a certain new and useful Process for Reclaiming Vulcanized-Rubber Waste, of which the following is a specification.

This invention is a process of reclaiming vulcanized-rubber waste; and it has for its object to so treat the waste material that it can be utilized in the shortest time possible, it being of more importance, considering the uses to which the product is intended to be put, to perform the process expeditiously than with perfect thoroughness.

I am aware that it is not broadly new to mix an alkali with vulcanized-rubber waste with the purpose of devulcanizing the rubber; but a substantial difference between the processes heretofore known and the present one resides in the fact that none of the known processes involves a compression of a mixture containing the vulcanized-rubber waste and a suitable sulfur-absorbing alkali before submitting the mass to the action of heat. A further substantial difference resides in the fact that my process is distinctively, from beginning to end, a dry process, even the temperature to which the heating of the mixture is carried being not so high as to cause the mixture to melt or liquefy.

By way of exemplification I will now describe the preferred manner of carrying out my method.

The vulcanized-rubber waste after having been mixed in a dry state with a sulfur-absorbing and powdered alkali is pressed into cakes in a suitable press, and such cakes are then submitted to a temperature of from 220° to 280° centigrade for two or three hours, according to the class of rubber being devulcanized or regenerated.

The mechanical work exerted while the mixture is being compressed into cakes facilitates and expedites the absorption of the sulfur by the alkali during the subsequent heating of the cakes, such compressing and subsequent heating constituting one of the essential features of the invention, as above indicated. This quickening action may be explained by reference to the fact that by compressing the mixture the rubber waste is brought into closer contact with the alkali, so that during the heating stage the rubber mass is very thoroughly and rapidly acted upon by the alkali, which speedily absorbs the sulfur as the rubber becomes desulfurized and may afterward in the washing-out process be readily removed. In previous processes of this kind the mixture at some stage or other has been liquefied, either by introducing oils or by melting. My process, which involves the use of dry ingredients and the maintaining of a temperature below the melting-point—220° to 280° centigrade—is distinctively a dry process from start to finish, with the result that the product is dry, and hence has no objectionable qualities, as undue stickiness, which makes it difficult to carry out the washing-out process. If there is much "filling" in the rubber waste, I may incorporate with the aforesaid mixture some dry pulverized resin, such as colophony, before compressing.

Having thus fully described my invention, what I claim as new, and desire to secure by Letters Patent of the United States, is—

1. The process of reclaiming vulcanized-rubber waste which consists in disintegrating the waste material, mixing it with an alkali, then compressing the mass, and then heating the mass, substantially as described.

2. The process of reclaiming vulcanized-rubber waste which consists in disintegrating the waste material, mixing it with an alkali and with a resin, then compressing the mass, and then heating the mass, substantially as described.

3. The process of reclaiming vulcanized-rubber waste which consists in disintegrating the waste material, mixing it in a dry state with a dry alkali, and then heating the mass to a temperature of 220° to 280° centigrade, substantially as described.

4. The process of reclaiming vulcanized-rubber waste which consists in disintegrating the waste material, mixing it in a dry state with a dry alkali, and then heating the mass to a temperature of 220° to 280° centigrade for a period of from two to three hours, substantially as described.

ADOLF KITTEL.

Witnesses:
   ALVESTO S. HOGUE,
   AUGUST FUGGER.